United States Patent [19]

Artweger

[11] 4,373,311
[45] Feb. 15, 1983

[54] INTEGRAL HOUSING BODY

[75] Inventor: Wolfgang Artweger, Windischgarsten, Austria

[73] Assignee: Hutter & Schranz Bautechnik Gesellschaft m.b.H., Klagenfurt, Austria

[21] Appl. No.: 145,888

[22] Filed: May 2, 1980

[30] Foreign Application Priority Data

Jun. 28, 1980 [AT] Austria .................................. 4502/79

[51] Int. Cl.³ ............................................. E04C 2/24
[52] U.S. Cl. ................................................... 52/282
[58] Field of Search ................. 52/309.5, 309.13, 631, 52/463, 282; 312/236

[56] References Cited

U.S. PATENT DOCUMENTS

| | | | |
|---|---|---|---|
| 1,549,205 | 8/1925 | Meyercord | 52/631 |
| 2,135,000 | 11/1938 | Crouch | 52/631 |
| 2,155,969 | 4/1939 | Green | 52/631 |
| 3,440,790 | 4/1969 | Neren | 52/631 |
| 3,481,642 | 12/1969 | Bonallack | 52/309.5 |
| 3,909,995 | 10/1975 | Bainter | 52/309.9 |
| 3,933,398 | 1/1976 | Haag | 312/236 |
| 4,192,113 | 3/1980 | Martin | 52/463 |

FOREIGN PATENT DOCUMENTS

| | | | |
|---|---|---|---|
| 2521539 | 12/1975 | Fed. Rep. of Germany | 52/631 |
| 260801 | 12/1946 | Switzerland | 52/631 |

*Primary Examiner*—John E. Murtagh
*Attorney, Agent, or Firm*—Kurt Kelman

[57] ABSTRACT

A housing body comprises a plurality of composite wall elements. Each wall element consists of two carrier plates and a rigid synthetic resin foam support member sandwiched therebetween. The support members of adjoining wall elements have faces spaced from each other and forming a corner between the adjoining wall elements. One of the plates is shaped to conform to the corner and spans the space between the faces of the support members of the adjoining wall elements whereby the one plate is common to the adjoining wall elements.

5 Claims, 10 Drawing Figures

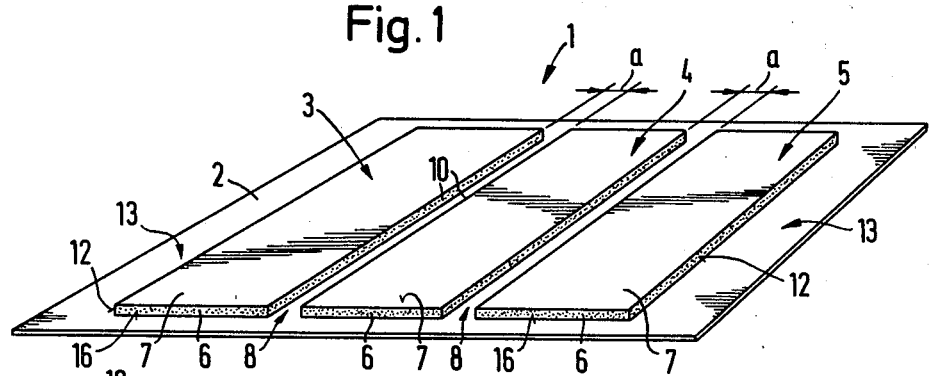
Fig. 1
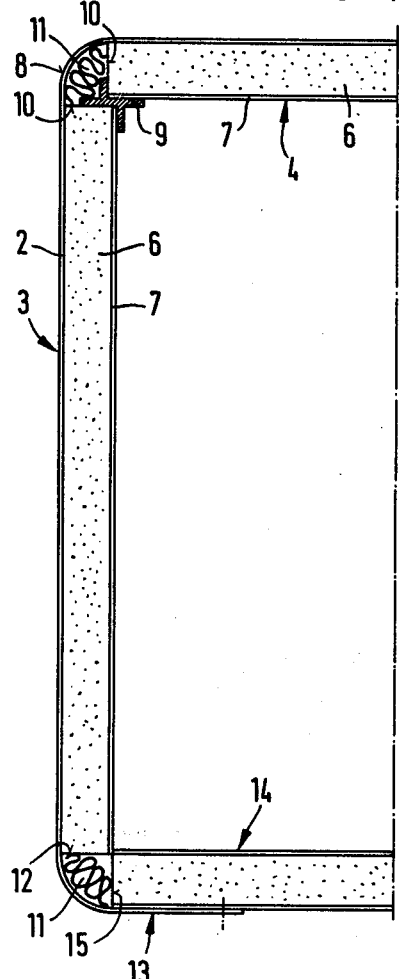
Fig. 2
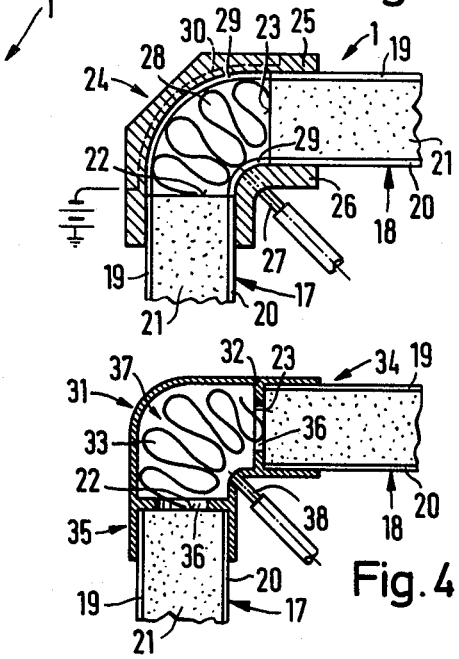
Fig. 3
Fig. 4
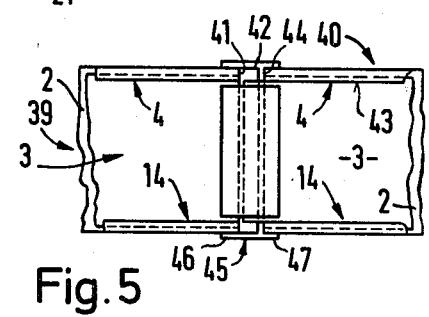
Fig. 5

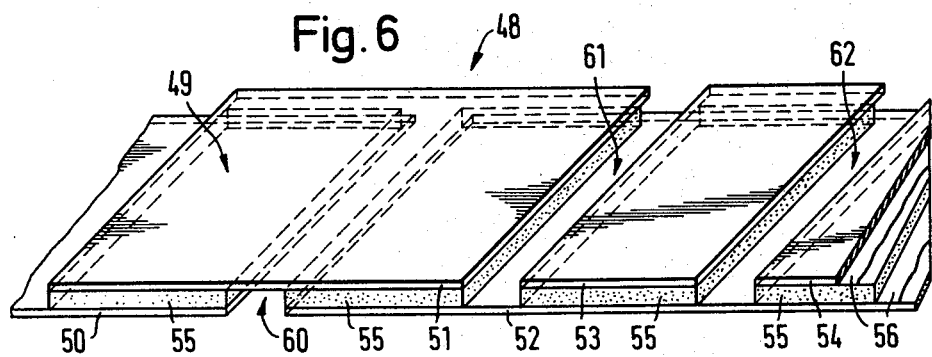
Fig. 6
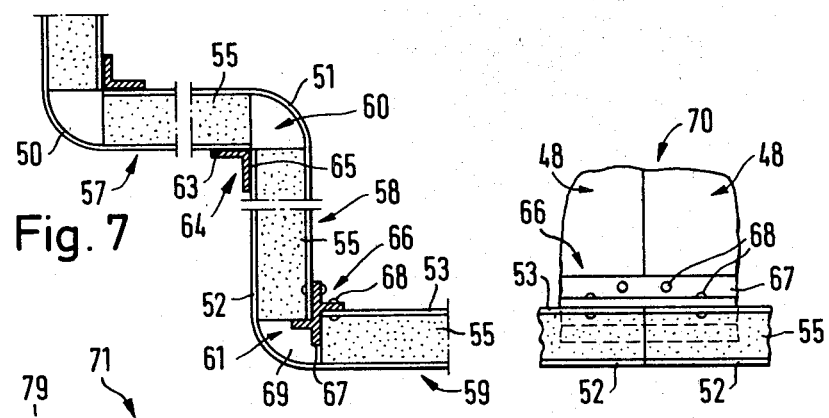
Fig. 7
Fig. 8
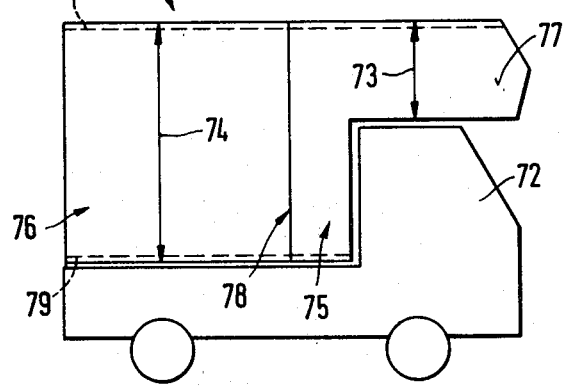
Fig. 9
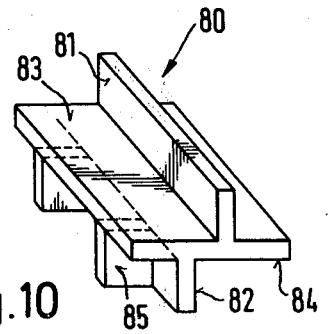
Fig. 10

INTEGRAL HOUSING BODY

The present invention relates to a housing body comprising a plurality of composite wall elements, each wall element consisting of two carrier plates and a rigid synthetic resin foam support member sandwiched therebetween. The two carrier plates form skins on the inside and outside of the support member. The housing body may define a cabin having sections of different cross sectional areas abutting at transition zones.

Such housing bodies useful for a variety of purposes are known, for examples, from Published German Patent Applications Nos. 1,530,934, 1,479,811 and 2,450,644. According to the first-named publication, adjoining wall elements are connected by specially shaped transition elements to produce an integral structure. The modular assembly of the wall elements produces many seams in the outer skin of the housing body and the manufacture of such a housing body is relatively expensive. Furthermore, many components must be stored to enable housing bodies of large dimensions and complex configuration to be assembled. In addition, it is virtually impossible to prevent fluid leaks to occur at the transition zones between the adjoining wall elements, thus making the resultant housing bodies useless or at least undesirable for carriage bodies. Attempts have been made to reduce these difficulties with respect to insulation by applying sealing or insulating masses in the transition zones after the assembly has been completed. Published German Patent Application No. 1,479,811 discloses an integral housing body comprised of a plurality of composite wall elements, including plane wall sections and corner pieces, each wall element being comprised of a synthetic resin foam core sandwiched between two cover plates. The wall elements are assembled so that faces of adjoining wall elements define cavities therebetween. An inflatable rubber hose coated with a tacky polyester is inserted into the cavity and is inflated while the adjoining wall elements are pressed together so that their faces adhere to the tacky polyester coating which is pneumatically pressed thereagainst by the air pressure in the rubber hose. After the polyester has been cured, the rubber hose is deflated and removed from the cavity, which is then filled with synthetic resin foam. While the cured polyester skin interconnects the wall elements in a force-transmitting manner, the foam filling does not constitute such a connection and the entire connecting part between the wall elements, therefore, is not load-bearing.

In Published German Patent Application No. 2,450,644, seams between adjoining wall elements are filled with a synthetic resin foam for rigidly interconnecting the adjoining wall elements into an integral housing body. Such a housing body has excellent qualities because filling the seams with a synthetic resin foam provides a very intimate connection between the wall elements of the body, which will withstand considerable loads. However, the erection of the housing involves relatively high expenditures for the manufacture of individual housing components of varying shapes and dimensions, particularly where the housings are large and of complex shape.

it is the primary object of this invention to simplify the manufacture of integral housing bodies of the indicated type, making it possible readily to erect such housings of different dimensions and shapes with a minimum of components while assuring a high load-bearing capacity for the entire structure, including the transition zones between adjoining wall elements forming a corner therebetween.

This and other objects are accomplished according to this invention with a housing body of the first-described type wherein the support members of adjoining ones of the composite wall elements have faces spaced from each other and forming a corner between the adjoining wall elements, one of the carrier plates being shaped conforming to the corner and spanning the space between the faces of the support members of the adjoining wall elements whereby the one plate is common to the adjoining wall elements. Where the housing body defines a cabin having sections of different cross sectional areas, the transition zones between the cabin sections are formed by a respective one of the corners.

This arrangement has the unexpected advantage of greatly reducing the seams between adjoining wall elements while simultaneously increasing the load-bearing capacity of the housing body since one of the carrier plates always spans the transition zone. This common carrier plate for two adjoining wall elements provides a very favorable force distribution over the entire transition zone and increase the resistance moment of the housing body thereat, particularly at the transition zones between abutting cabin sections of different cross sectional areas. This makes it possible to manufacture such housing bodies without frames while, at the same time, considerably improving the insulating property of the housing.

Integral housing bodies of such structure may be produced very inexpensively and rapidly in all sizes and shapes, and minimum of components and forms being required. The number of structural components is reduced because all parts of the housing body are load-bearing, thus making special carrier frames for the mounting of prefabricated flat wall elements unnecessary. Nevertheless, these housing bodies are capable of sustaining and resisting high load without collapsing. The housing bodies can be made from commercially available flat wall elements which are assembled simply by rigidly interconnecting these wall elements in a force-transmitting manner by load-bearing connecting parts, such as by injection molding synthetic resin foam cores into cavities between the adjoining faces of the wall elements, the foam cores adhering firmly to the adjoining faces to produce an integral structure. Such assembly requires a minimum of space, thus further reducing the costs of mass production.

The above and other objects, advantages and features of the present invention will become more apparent from the following detailed description of certain now preferred embodiments thereof, taken in conjunction with the accompanying schematic drawing wherein FIG. 1 is a perspective top view illustrating an assembly stage wherein the composite wall elements are insulating support members rigidly mounted on a common carrier plate in a force-transmitting manner, the support members of adjoining wall elements having faces spaced from each other;

FIG. 2 is a partial end view of a rectangular housing body shaped from composite wall elements of FIG. 1 after the common carrier plate has been bent in the range of the space between the faces of the adjoining support members and synthetic resin foam cores have been injection molded into these spaces to provide load-bearing connecting parts;

FIG. 3 is a partial end view of a corner of another housing body embodiment, showing a mold for a synthetic resin foam connecting part to which two adjoining wall elements are clamped;

FIG. 4 is a similar end view of still another embodiment comprising a hollow corner stud constituting a mold for a synthetic resin foam connecting part to which two adjoining wall elements are clamped;

FIG. 5 is a partial side view of two coplanar wall elements rigidly interconnected by a load-bearing connecting part;

FIG. 6 is a view similar to FIG. 1 and illustrating a flat wall blank for making a housing body according to this invention;

FIG. 7 is a partial side view of a portion of a housing body shaped from the wall blank of FIG. 6 and defining a cabin having sections of different cross sectional areas;

FIG. 8 is a partial end view of two assembled wall elements at the transition zone;

FIG. 9 is a schematic side view of a housing body according to the invention mounted on a flat-bed truck; and FIG. 10 is a perspective view of a stud useful in the assembly.

The subject matter illustrated in FIGS. 1 to 5 has been described in copending application Ser. No. 45,957, filed June 6, 1979 and replaced by continuation application Ser. No. 318,633, filed Nov. 5, 1981, of which the present inventor is a joint inventor, and enables a fuller understanding of the invention claimed herein. Referring first to FIGS. 1 and 2, integral housing body 1 is shown to comprise a plurality of composite wall elements 3, 4, 5 and load-bearing connecting part 11 rigidly interconnecting adjoining ones of the wall elements in a force-transmitting manner. In this embodiment, the wall elements are insulating support members 6 rigidly mounted on a common carrier plate 2 in a force-transmitting manner. In the illustrated embodiment, carrier plates 7 are laminated to the surfaces of the insulating support members opposite the surfaces bonded to common carrier plate 2 whereby the load-bearing capacity of the wall elements is enhanced, the support members being sandwiched between the carrier plates. If the insulating support members are rigid synthetic resin foam plates, the carrier plates are rigidly connected thereto during the foaming process whereby plates 2 and 7 will firmly adhere to support members 6 to constitute strong, load-supporting wall elements. However, the insulating support members may consist of other suitable materials, such as glass fiber or glass fiber reinforced structural elements, and the carrier plates may be bonded thereto by adhesive coatings. Plates 7 may be of any suitable rigid material, such as wood, synthetic resin, aluminum or other sheet material.

An adhesive coating is applied to common carrier plate 2 and insulating support members 6 are rigidly mounted thereon in a force-transmitting manner by bonding the support members to the carrier plate by means of the adhesive coating, preferably under vacuum. Alternatively, if the support members are of synthetic resin foam, they may be foamed directly onto the common carrier plate to establish the necessary firm bonding. These strong bonds between the components of the composite wall elements provide the desired force-transmitting connection therebetween, thus imparting a high load-bearing capability to the wall elements.

The support members of the adjoining wall elements have faces 10 spaced from each other to define range 8 of a space or cavity between the adjoining wall elements and each load-bearing connecting part 11 is bonded rigidly to carrier plate 2 and faces 10 of the adjoining wall elements in a force-transmitting manner. Again, unless there is a firm, force-transmitting connection between the connecting part and the adjacent faces of the wall elements, range 8 of the housing body would not be load-bearing. With these force-transmitting connections, the wall elements and the connecting parts become substantially integral with each other to form an integral housing body all of whose sections are load-bearing. As shown in the drawing, the support members of the wall elements are sandwiched between common carrier plate 2 and plates 7, and constitute substantially integral housing body components.

As is obvious from FIG. 1, common carrier plate 2 may be readily and with a relatively small force bent in ranges 8 to form corners between wall elements 3, 4, 5 to shape the composite structure into a housing body of a desired configuration, the common carrier plate forming a strong and self-supporting continuous outer skin for the housing body, not only in the area of the wall elements but also in the corner zones therebetween. The integral housing body may thus be erected in a very simple assembly procedure and considerable savings may often be achieved since no complex presses for making body parts are required.

As FIG. 2 illustrates, integral housing body 1 is produced simply by shaping flat carrier plate 2 to assure the configuration of the housing. the corners of the housing body being produced by bending the carrier plate in ranges 8 between wall elements 3, 4, 5 and the wall elements having the dimensions of the housing walls. In ranges 8, faces 10 of the support members of adjoining wall elements are spaced from each other by distance a which corresponds to the length of the bending arc of the carrier plate, which produces the rounded corners of the housing body. The reinforced wall sections comprised of insulating support members 6 sandwiched between, and laminated to, carrier plates 2 and 7 may be readily positioned to enclose a desired angle with each other, the illustrated housing body being rectangular so that the angle between the walls is 90°. As shown in FIG. 2, studs 9 may be used at the corners to serve as abutments limiting the relative movement of the wall elements during shaping of the housing body and for holding the wall elements at the desired angle at each corner. Distance a between the wall elements is selected so that faces 10 intersect at the corners so that the wall elements abut in a line of intersection.

In accordance with this invention, a stable housing body which has a continuous load-bearing frame without any weak spots is produced by rigidly interconnecting the adjoining wall sections in a force-transmitting and shape-retaining manner by load-bearing connecting parts 11. These load-bearing connecting parts are provided at the otherwise weak ranges 8 where the carrier plate has been bent and which are free of the load-bearing wall elements. To achieve the desired result, load-bearing connecting parts 11 must be strongly bonded to faces 10 of the adjoining wall elements and to carrier plate 2 to form an integral structure at the junctures between the adjoining wall elements so that these junctures are fully load-bearing, retain their shape and transmit all forces to which the housing may be subjected.

If desired, load-bearing connecting parts 11 may be prefabricated rigid synthetic resin shapes, for instance synthetic resin foam shapes, which are inserted into the cavities between the adjoining wall elements after the housing body has been shaped, adhesive coatings being applied to respective surfaces of the inserts and/or adjacent faces 10 and carrier plate 2 to interconnect all components rigidly in a force-transmitting and shape-retaining manner. Preferably, however, and as shown herein, connecting parts 11 comprise a rigid synthetic foam core which is injection-molded in situ, which assures the desired force-transmitting and shape-retaining connection between the connecting parts, adjacent faces 10 and carrier plate 2. In the injection molding of connecting parts 11, studs 9 may serve as sealing forms enabling the synthetic resin foam to be molded in situ and preventing any resin from leaking through the seam of the abutting wall elements. This manufacture is particularly economical since studs 9 serve as abutments during the shaping stage for properly setting the corners of the housing body and then also serve as sealing forms in the subsequent injection molding stage during which the wall elements are rigidly interconnected. The synthetic resin is introduced into the cavity between support members 6, which preferably also are of synthetic resin foam, in liquid form and is cured in situ to produce the load-bearing connection which assures a stable housing body without any weak points. As shown in FIG. 2, the completed housing body has a continuous outer skin constituted by common carrier plate 2 and interior wall faces of any desired type produced by a suitable selection of materials for plates 7.

As shown in FIG. 1, common carrier plate 2 has respective end portions 13 projecting beyond opposite faces 12 of outer wall elements 3 and 5. When housing body 1 is shaped in the manner indicated in FIG. 2, end portions 13 of the carrier plate are also bent over to provide supports for floor plate 14 which is placed on these carrier plate end portions. The cavity between faces 12 of wall elements 3 and 5 and end faces 15 of floor plate 14 is again filled with load-bearing connecting part 11 to provide a rigid force-transmitting and shape-retaining interconnection.

If desired, common carrier plate 2 may carry four or more wall elements to produce an integral housing body comprised of a corresponding number of wall elements, thus eliminating the insertion of a special floor plate. Also, the wall elements need not be perpendicular to each other but may enclose any selected angle without in any way changing the nature of their load-bearing interconnection which assure shape retention and transmission of all forces between the connected wall elements. It is also possible, for instance, to connect two like carrier plates 2, carrying support members 6, along faces 16 of the support members and then to shape the integral housing body from this combined structure, providing the load-bearing connecting parts in the cavities between faces 16 of adjoining wall elements.

In the embodiment illustrated in FIG. 3, individual prefabricated wall elements 17 and 18 are used in producing integral housing body 1, each wall element being comprised of insulating support member 21 sandwiched between, and laminated to, carrier plate 19, which forms the outside facing of the housing body, and plate 20, which forms the interior facing. Effective wall elements may be produced by injection molding the insulating support member between the carrier and support plates, which may be interconnected by spacer elements, so that the three components of the sandwich element will be in force-transmitting and shape-retaining connection. Polyurethane foams make excellent insulating support members.

As in the first-described embodiment, adjoining wall elements 17 and 18 have faces 22 and 23 spaced from each other and load-bearing rigid synthetic resin foam core 28 is rigidly bonded to faces 22, 23 in a force-transmitting manner to form the load-bearing connecting part which rigidly interconnects adjoining wall elements 17, 18. This structure is of particular advantage in erecting integral housing bodies comprised primarily or exclusively of flat wall elements. Flat sandwich wall elements of the described type can be mass produced at low cost and may then be interconnected according to the invention to produce variously shaped and sized housing bodies. It is an additional advantage that the prefabricated wall elements need not be completely placed into suitable forms during the erection of the housing body, thus saving on forms for building housing bodies of different dimensions.

As shown in FIG. 3, integral housing body 1 is produced from adjoining wall elements 17, 18 by encasing the corner of the housing body constituted by the adjoining wall elements in mold 24 and filling the cavity between faces 22 and 23 of the adjoining wall elements by injection molding a synthetic resin in the mold to form foam 28 while clamping end portions of the adjoining wall elements adjacent faces 22, 23 in the mold. As shown, the mold consists of mold walls 25 and 26, and the end portions of the adjoining wall elements are clamped between the mold walls to form fluid-tight seals for the injection chamber of the mold. Injection conduit or sprue runner 27 is attached to mold wall 26 to introduce liquid synthetic resin into the cavity defined within the mold by faces 22 and 23, and the resin is foamed and cured in situ in the cavity to produce a load-bearing connecting part rigidly interconnecting adjoining wall elements 17, 18 in a force-transmitting and shape-retaining manner, the foaming and curing process in situ assuring a particularly firm bonding between connecting part 28 and wall elements 17, 18 to assure a substantially integral structure.

If desired and as shown, mold walls 25 and 26 may be lined with sheets 29 between faces 22 and 23 of the adjoining wall elements before the synthetic resin is injected to form an inner and outer skin on the injection molded synthetic resin foam connecting part 28. Sheets 29 may be of the same material as plates 19 and 20. In this manner, the wall elements will be rigidly interconnected into an integral structure and, at the same time, a continuous and uniform exterior and interior wall facing will be provided at the corners of the housing body, thus obtaining the same effect as in the embodiment of FIGS. 1 and 2 where a common carrier plate forms a continuous skin.

Curing of the synthetic resin foam will be enhanced and the rigidity of the foam forming the load-bearing connecting part will be inreased if mold 24 is heated, for which purpose one of the mold walls may carry an electrical resistance heater 30, as schematically shown in FIG. 3.

In the embodiment of FIG. 4, no special mold is required for the rigid interconnection between adjoining wall elements 17 and 18, this mold being replaced by load-bearing studs 32 which serve as sealing forms or molds defining cavity 37. Injection conduit or sprue 38 is attached to stud 32 to form synthetic resin foam core 33 in cavity 37, the core firmly adhering to the walls of stud 32 to constitute load-bearing connecting part 31. Stud 32 may be an aluminum shape having respective end walls adjacent faces 22, 23 and rabbets 34, 35 project from the end walls. The rabbets receive the end portions of wall elements 17, 18 adjacent faces 22, 23 so that the wall elements are clamped therein. The end walls of stud 32 have orifices 36 through which caviety 37 communicates with faces 22, 23 of the adjoining wall elements. In this manner, rigid synthetic resin foam forms load-bearing core 33 in cavity 37 rigidly bonded in a force-transmitting manner to faces 22, 23 of the adjoining wall elements through orifices 36. This force-transmitting connection of core 33 to wall elements 17, 18 is essential to produce a substantially integral structure according to the present invention.

Studs 9 and 32 may be made of any suitable sheet material, including aluminum, rigid synthetic resin, wood and other structural materials.

The fragmentary illustration of FIG. 5 shows how two housing portions 39, 40 may be combined into a unitary housing body, each housing portion consisting of wall elements 3, 4, 14 in the manner shown in FIGS. 1 and 2, as fully described hereinabove. In this embodiment, carrier plate 2 of one of the housing portions, for instance housing portion 39 in the illustrated embodiment, has an end portion projecting beyond the erected housing portion, the projecting end portion of the carrier plate having a width corresponding to that of load-bearing connecting part 42 between the two adjoining housing portions. Carrier plates 43 of the same width also project from the erected housing portion to provide a lateral enclosure for a cavity defined between faces 41 and 44 of the adjoining housing portions 39, 40. This cavity is then filled with a synthetic resin foam core to provide a load-bearing connecting part combining the two housing portions into an integral housing body.

In addition or in place of the projecting end portion of carrier plate 2 and projecting carrier plates 43, carrier body 45 may be mounted between the faces of the adjoining housing portions. This carrier body has two rabbets 46, 47 which receive the end portions of housing portions 39, 40 adjacent faces 41 and 44 so that the housing portions are clamped into the carrier body simply by being plugged into the rabbets. This load-bearing connection will be visually particularly pleasing if the two lateral end walls of the carrier body are made of chromium-plated or rubber sheets to provide suitable moldings.

This combination of a series of aligned housing portions makes it possible to produce an integral housing body of considerable length, a series of housing portions being plugged together and rigidly interconnected by load-bearing connecting parts in a force-transmitting manner.

It is obvious from the above description that housing bodies manufactured in the indicated manner and having the uniform load-bearing property due to the special nature of the connecting parts between adjoining wall elements are not only exceptionally stable and substantially homogenous but also can be provided with a continuous outer skin protecting the housing body from environmental hazards, such as rust, corrosion and the like. If the integral housing body is made in accordance with the embodiments of FIGS. 3 and 4, relatively large housing bodies may be made from relatively small components parts, thus saving assembly space. When the connecting parts are injection molded synthetic resin foams, heatable molds enable the foam cores to be cured so that the properties of the core will conform to those of the wall element support members, thus providing a homogenous structure.

Obviously, a wide range of composite wall elements may be used in such integral housing bodies. Thus, insulating support members 6 may be made of any suitable structural synthetic resin or other insulating material. Carrier plates 7 may be made of wood, synthetic resin, ferrous or non-ferrous sheet metal, or any other structural sheet material producing the desired interior facing.

The present invention will be understood in the light of the foregoing description from FIGS. 6 to 10 to be described hereinafter. It is more specifically concerned with the corner structures of housing bodies constituted by a plurality of sandwich wall elements. Referring now to FIG. 6, there is shown flat wall blank 48 for shaping a knee portion 49 of a housing body (see FIG. 7) defining a cabin having sections of different cross sectional areas, wall element 57 constituting the floor of one such cabin section, wall element 59 constituting the floor of an adjacent cabin section of different cross sectional area and wall element 58 interconnecting the two floors. Such housing bodies, as shown in FIG. 9, may serve as carriage bodies 71 mounted on a flat-bed truck 72, serving for recreational purposes, as a cooling container, a mobile machine shop or the like.

As will be appreciated from a consideration of FIGS. 6 and 7, the housing body comprises a plurality of composite wall elements, each wall element consisting of two carrier plates and rigid synthetic resin foam support member 55 sandwiched therebetween. The support members of adjoining wall elements 57, 58, 59 have faces spaced from each other at 60, 61, 62 and, as illustrated in FIG. 7, upon bending of the wall blank at these spaces, they form corners between the adjoining wall elements, the corner at space 62 not being shown in the partial view of FIG. 7 while this figure shows such a corner at the far end of wall element 57 not seen in the partial view of FIG. 6. One of carrier plates 50, 51, 52 of each wall element is shaped to conform to the corners and spans space 60, 61, 62, respectively, between the faces of support members 55 of the adjoining wall elements whereby this one carrier plate is common to the adjoining wall elements. As shown at 53 and 54, the opposite carrier plate of a wall element may merely be co-extensive with its respective support member. If desired, the support members may consist of any suitable insulating material generally equivalent to a rigid synthetic resin foam. They are laminated to the carrier plates forming an inner and an outer skin by adhesive coatings 56, a force-transmitting connection between the sandwich components being obtained by pressing the components together under high pressure in a vacuum until the adhesive coating has been cured. Such rigid bonding provides a housing body of integral structure.

In the housing body embodiment of FIG. 7, a first pair of adjoining wall elements 47, 57 defines one of the cabin sections and a second pair of adjoining wall elements 58, 59 defines another cabin section adjacent thereto. One wall element 57 of the first pair adjoining one wall element 58 of the second pair and forms corner 60 therebetween. The one common carrier plate 50 and 52 for adjoining wall elements 47, 57 and 58, 59 of each pair extends over support members 55 thereof and corners 46 and 61, respectively, therebetween on one side of the support members. The other carrier plate 51 extends over support members 55 of wall elements 57 and 58 of the first and second pair adjoining each other as well as corner 60 therebetween on the other side whereby other plate 51 is common to adjoining wall elements 57 and 58 of the first and second pair. In this manner, there is a continuous skin extending at one side of each corner over the housing body, assuring that there is no weak point in the body and no through-seam at any corner.

As shown, the adjoining wall elements of each pair of the illustrated housing body portion are substantially perpendicular to each other and the wall elements of the first and second pair adjoining each other are also substantially perpendicular to each other, the one side being the outside of the housing body and the other side being the inside thereof. The four wall elements form two knees one of whose legs forms a third knee connecting the two knees.

As shown in FIG. 7, at the insides of corners 64 and 66 of each knee, studs 63 and 67 interconnect abutting plates 50, 52 and 51, 53 not common to adjoining wall elements 57, 58, 59 in a force-transmitting manner. Stud 63 is shown as a simple angle iron while stud 67 will be more fully described hereinafter in connection with FIG. 10. The studs may be connected to the abutting plates in any suitable force-transmitting manner, for example by adhesive coating 65 or rivets 68 of equivalent mechanical fastening means. Usefully, the studs may be of aluminum, which is light and weather-resistant.

As has been more fully described in connection with FIGS. 1 to 5, load-bearing rigid synthetic resin foam core 69 may be provided in the space in each corner and rigidly bonded to the common plate spanning the space and to the faces of support members 55 of the adjoining wall elements for connecting the adjoining wall elements in a force-transmitting manner into an integral structure.

FIG. 8 illustrates the joining of two like housing portions formed by two like wall blanks 48, 48 abutting along seam 70, the connection at corner 66 being shown. The two wall elements are joined by a common stud at the corner, which spans the seam and extends over both adjoining wall elements. The force-transmitting connection between the stud and the adjacent carrier plates of the wall elements, such as by rivets 68, imparts to the stud the quality of a tie rod which distributes the loads over both housing portions uniformly even if they are subjected to uneven loads.

FIG. 9 schematically illustrates housing body 71, which includes the configuration of FIG. 7, mounted on small truck 72 to serve, for example, as a recreational vehicle. As indicated by double-headed arrows 73 and 74, this housing body defines a cabin having sections of different cross sectional areas, i.e. of different height, the floor of cabin section 73 being formed by wall element 57 while the floor of cabin section 74 is formed by wall element 59. The housing body is comprised of two assembled housing modules 75 and 76 which are connected at transition zone or seam 78 (see, for example, FIG. 5) and outer carrier plate 77 of the wall element forming cabin section 75 spans the transition zone to cover the seam. Furthermore, longitudinally extending stud 79 is mounted in the corners of the housing body at least along the roof (such a reinforcing stud also being shown along the floor) to improve the load distribution and, more particularly, to avoid any weak point at the transition between the two cabin sections at the rear of the cab of truck 72.

FIG. 10 shows a preferred stud 80, such as indicated at 9 in FIG. 2 and at 67 in FIG. 7. This stud is a shaped element, for example of aluminum, having a first abutment part, portion 83 of the first abutment part being adjacent one of the abutting carrier plates of one wall element (58 in FIG. 7) and being connected thereto (by rivets 68 in the embodiment of FIG. 7) and another portion 84 thereof extending into the space (61 in FIG. 7) at the corner and being adjacent the face of support member 55 of one of the adjoining wall elements (59 in FIG. 7). Other abutment part portion 84 is connected to the support member face. Two additional abutment parts 81 and 82 extend substantially perpendicularly from first abutment part 83, 84. Additional abutment part 81 is adjacent the other abutting plate (53 in FIG. 7) and is connected thereto. The other additional abutment part 82 extends into the space at the corner and is adjacent the face of the support member of the other adjoining wall element (58 in FIG. 7), the other additional abutment part being connected to the adjacent support member face. In the embodiment of FIG. 7, portion 83 of the first abutment part and additional abutment part 81 are respective mechanically fastened to adjacent plates 51 and 53 by rivets 68 while other portion 84 of the first abutment part and other additional abutment part 82 are adhesively bonded to the support member faces. As shown at 65, the mechanical fastening may be replaced by adhesive bonding. Also, to increase the load-bearing connection between the stud and adjacent support members 55, anchoring elements 85 project from additional abutment part 82 and penetrate the support member adjacent thereto when the latter is foamed in situ between the carrier plates. This increases the stress capacity and load-bearing property of the stud and thus further enhances the rigidity of such an integral housing body serving as a cabin.

As clearly shown in FIG. 9, such a housing body is very useful in a recreational vehicle, such as a mobile home, since it is very rigid and makes very good use of the available space without increasing the over-all dimensions of the vehicle, a portion of the housing body being of reduced cross sectional area to enable it to fit over the cab of the truck carrying the housing body.

Of course, the housing body is also very useful for cabins for all types of commercial, medical or military uses, including refrigerated transports which require highly insulated walls. The integral housing structure is very strong and capable of sustaining heavy loads with relatively thin wall elements.

The manufacture of these housing bodies is very simple and accordingly inexpensive, the carrier plates and support members of the sandwich wall elements being prefabricated, flat sheets readily available in commerce. These components need only be bonded together to form the wall blanks shown in FIGS. 1 and 6, shaped by bending one of the carrier plates at the corners, as shown in FIGS. 2 and 7, and interconnected into an integral structure by foaming the load-bearing connecting parts into the spaces at the corners, with reinforcing studs preferably applied at the corners in the illustrated manner. No frame is required, leaks are avoided to increase the insulating capacity of the housing, and the loads are evenly distributed in the corner regions.

What is claimed is:

1. A housing body comprising a plurality of composite wall elements, each wall element consisting of an outer carrier plate, an inner carrier plate and a rigid synthetic resin foam support member sandwiched therebetween, the support members of adjoining one of the wall elements having end faces spaced from each other and forming a corner between the adjoining wall elements, the outer carrier plate being shaped to form the corner and spanning the space between the end faces of the support members of the adjoining wall elements whereby the outer carrier plate is common to the adjoining wall elements and the support member end faces define the space with the outer carrier plate, a load-bearing rigid synthetic resin foam core in the space and rigidly and directly bonded to the outer carrier plate and to the end faces of the support members of the adjoining wall elements in a force-transmitting manner, adjacent ones of the wall elements extending substantially perpendicularly to each other, alternating ones of the wall elements being substantially parallel to each other, all the wall elements and interconnecting foam cores forming an integral structure, and alternating ones of the foam cores being connected to alternating ones of the carrier plates, and studs at the corners, the studs interconnecting abutting ones of the inner carrier plates and the studs being shaped elements having a first abutment part, a portion of the first abutment part being adjacent one of the abutting plates and being connected thereto and another portion thereof extending into the space at the corner and being adjacent the face of the support member of one of the adjoining wall elements, the other abutment part portion being connected to the support member face, and two additional abutment parts extending substantially perpendicularly from the first abutment part, one of the additional abutment parts being adjacent the other abutting plate and being connected thereto and the other additional abutment part extending into the space at the corner and being adjacent the face of the support member of the other adjoining wall element, the other additional abutment part being connected to the adjacent support member face.

2. The housing body of claim 1, wherein the shaped elements are of aluminum.

3. The housing body of claim 1, wherein the abutment parts are respectively adhesively bonded to the adjacent plates and support member faces.

4. The housing body of claim 1, wherein the portion of the first abutment part and the one additional abutment part are respectively mechanically fastened to the adjacent plates, the other portion of the first abutment part and the other additional abutment part being adhesively bonded to the support member faces.

5. The housing body of claim 1, wherein the other portion of the first abutment part and the other additional abutment part are adhesively bonded to the support member faces, the other abutment part portion or the other additional abutment part comprising anchoring elements projecting therefrom and penetrating the support member adjacent thereto.

* * * * *